United States Patent
Schrenk

(10) Patent No.: US 10,911,147 B2
(45) Date of Patent: Feb. 2, 2021

(54) SYSTEM AND METHOD FOR DATA TRANSMISSION

(71) Applicant: AIT AUSTRIAN INSTITUTE OF TECHNOLOGY GMBH, Vienna (AT)

(72) Inventor: Bernhard Schrenk, Ulrichskirchen (AT)

(73) Assignee: AIT Austrian Institute of Technology GmbH, Vienna (AT)

( * ) Notice: Subject to any disclaimer, the term of this patent is extended or adjusted under 35 U.S.C. 154(b) by 0 days.

(21) Appl. No.: 16/848,300

(22) Filed: Apr. 14, 2020

(65) Prior Publication Data
US 2020/0343978 A1    Oct. 29, 2020

(30) Foreign Application Priority Data
Apr. 25, 2019   (AT) ............................... A 50374/2019

(51) Int. Cl.
*H04B 10/00* (2013.01)
*H04B 10/50* (2013.01)
(Continued)

(52) U.S. Cl.
CPC ......... *H04B 10/5057* (2013.01); *H04B 10/61* (2013.01); *H04L 7/0075* (2013.01)

(58) Field of Classification Search
CPC ........ H04B 10/43; H04B 10/60; H04B 10/61; H04B 10/63
See application file for complete search history.

(56) References Cited

U.S. PATENT DOCUMENTS 6,233,082 B1   5/2001  Johnson
6,665,457 B2  12/2003  Lundqvist
(Continued)

FOREIGN PATENT DOCUMENTS

| EP | 1093244 A1 | 4/2001 |
| GB | 2474455 A  | 4/2011 |
| WO | 03023915 A2 | 3/2003 |

OTHER PUBLICATIONS

Schrenk, Bernhard, "Injection-Locked Coherent Reception Through an Externally Modulated Laser", Mar./Apr. 2018, IEEE Journal of Selected Topics in Quantum Electronics, vol. 24, No. 2.*
(Continued)

*Primary Examiner* — Daniel G Dobson
(74) *Attorney, Agent, or Firm* — Laurence A. Greenberg; Werner H. Stemer; Ralph E. Locher

(57) ABSTRACT

A system for data transmission has a transmitter and a receiver connected by an optical channel. The transmitter has a transmitter laser and a transmitter-side electroabsorption modulator with an optical output. An electrical data input of the transmitter is connected to an electrical modulation terminal of the transmitter-side electroabsorption modulator. The receiver has a receiver laser and a receiver-side electroabsorption modulator with an optical output forming the input of the receiver. An electrical data output of the receiver is connected to the electrical modulation terminal of the receiver-side electroabsorption modulator. The transmitter and receiver lasers are detunable by specification of a physical variable, each provided by a respective control unit. The control units are synchronized and they specify the same signal at their outputs for establishing the physical variable for establishing the laser frequency.

12 Claims, 2 Drawing Sheets

(51) Int. Cl.
  *H04B 10/61* (2013.01)
  *H04L 7/00* (2006.01)
  *H04J 14/00* (2006.01)

(56) References Cited

U.S. PATENT DOCUMENTS

| | | |
|---|---|---|
| 2005/0129077 A1 | 6/2005 | Lundqvist |
| 2006/0159465 A1 | 7/2006 | Schulz et al. |
| 2007/0237193 A1 | 10/2007 | Finzi et al. |
| 2008/0025358 A1 | 1/2008 | Arahira |
| 2009/0080904 A1 | 3/2009 | Nakamoto |
| 2012/0189321 A1 | 7/2012 | Whiteaway et al. |

OTHER PUBLICATIONS

Ido T. et al.: "Strained InGaAs/InAlAs MQW Electro-Absorption Modulators with Large Bandwidth and Low Driving Voltage" IEEE Photonics Technology Letters, vol. 6, No. 10, Oct. 1994 (Oct. 1, 1994), pp. 1207-1209, DOI:10.1109/68.329640.

Schrenk Bernhard: "Injection-Locked Coherent Reception Through an Externally Modulated Laser." IEEE Journal of Selected Topics in Quantum Electronics, vol. 24, No. 2, Mar./Apr. 2018, published Nov. 22, 2017 (Nov. 22, 2017) pp. 1-7, DOI: 10.1109/JSTQE.2017.2776518.

Schrenk Bernhard et al. "A Coherent Homodyne TO-Can Transceiver as Simple as an EML", Journal of Lightwave Technology, vol. 37, No. 2, Jan. 15, 2019, published Nov. 9, 2018 (Nov. 9, 2018), pp. 555-561, DOI:10.1109/JLT.2018.2879435.

Feng Zitong et al.: "Coherent optical and RF receiver for simultaneously transferring frequencies in optical and RF domain", 2019 Joint Conference of the IEEE International Frequency Control Symposium and European Frequency and Time Forum (EFTF/IFC), Apr. 14-18, 2019 (Apr. 14, 2019), pp. 1-3, DOI: 10.1109/FCS.2019.8856144.

\* cited by examiner

US 10,911,147 B2

SYSTEM AND METHOD FOR DATA TRANSMISSION

CROSS-REFERENCE TO RELATED APPLICATION

This application claims the priority, under 35 U.S.C. § 119, of Austrian patent application AT A50374/2019, filed Apr. 25, 2019; the prior application is herewith incorporated by reference in its entirety.

BACKGROUND OF THE INVENTION

Field of the Invention

The invention relates to a system for data transmission, comprising a transmitter and a receiver, connected to the transmitter by way of an optical channel, and to a data transmission method.

Devices for transmitting data or signals, comprising a laser and an electroabsorption modulator, are known from the prior art. The light emitted by the laser is attenuated by the electroabsorption modulator, so that the light is present in modulated form at the output of the electroabsorption modulator and can be transmitted to a receiver by way of an optical waveguide.

So as to enable a coherent detection of the transmitted signal in such a system, precise agreement between the laser frequency of the transmitter and that of the receiver is required. However, the signal transmitted by way of the optical channel may be partially superimposed, for example, with the reflection of light on discontinuities in the optical channel, resulting in diminished detection of the signal at the receiver.

SUMMARY OF THE INVENTION

It is accordingly an object of the invention to provide a data transmission device and method, which overcome a variety of disadvantages of the heretofore-known devices and methods of this general type and which provides for remedies in this regard, and to provide a system and a method that minimize crosstalk of the reception signal caused, for example, by discontinuities in the optical channel.

With the above and other objects in view there is provided, in accordance with the invention, a system for data transmission between a transmitter and a receiver. The system comprising:

the transmitter and the receiver connected to the transmitter by way of an optical channel;

said transmitter including a transmitter laser and a transmitter-side electroabsorption modulator connected downstream of said transmitter laser;

said transmitter-side electroabsorption modulator having an optical output forming an output of said transmitter and being coupled to the optical channel; and said transmitter having an electrical data input connected to an electrical modulation terminal of said transmitter-side electroabsorption modulator;

said receiver including a receiver laser and a receiver-side electroabsorption modulator connected downstream of said receiver laser;

said receiver-side electroabsorption modulator having an optical output forming an input of said receiver and being coupled to the optical channel;

and said receiver having an electrical data output connected to an electrical modulation terminal of said receiver-side electroabsorption modulator;

said transmitter laser and said receiver laser being detunable by a specification of a physical variable;

a transmitter-side control unit configured to specify the physical variable for detuning said transmitter laser and a receiver-side control unit configured to specify the physical variable for detuning said receiver laser;

said transmitter-side control unit and said receiver-side control unit being synchronized with one another; and each of said transmitter-side control unit and said receiver-side control unit having an outputs configured to specify the same signal for establishing the physical variable for establishing the laser frequency.

In other words, the objects of the invention are achieved by a system for data transmission, which includes a transmitter and a receiver that are connected by way of an optical channel. In the system, the transmitter comprises a transmitter laser and a transmitter-side electroabsorption modulator connected downstream of the transmitter laser, the optical output of the transmitter-side electroabsorption modulator forming the output of the transmitter and being coupled to the optical channel, and the transmitter comprising an electrical data input, which is connected to the electrical modulation terminal of the transmitter-side electroabsorption modulator;

the receiver comprises a receiver laser and a receiver-side electroabsorption modulator connected downstream of the receiver laser, the optical output of the receiver-side electroabsorption modulator forming the input of the receiver and being coupled to the optical channel, and the receiver comprising an electrical data output, which is connected to the electrical modulation terminal of the receiver-side electroabsorption modulator;

the transmitter laser and the receiver laser are detunable by the specification of a physical variable, in particular by the specification of the laser current or the laser temperature;

a transmitter-side control unit and a receiver-side control unit are provided, which each specify the respective physical variable for detuning the respective laser;

the transmitter-side control unit and the receiver-side control unit are synchronized with one another; and the transmitter-side control unit and the receiver-side control unit, at the outputs thereof, each specify the same signal for establishing the physical variable for establishing the laser frequency.

With the above and other objects in view there is also provided, in accordance with the invention, a method for data transmission between a transmitter and a receiver connected to the transmitter by way of an optical channel. According to the invention:

the transmitter comprises a transmitter laser and a transmitter-side electroabsorption modulator connected downstream of the transmitter laser, the optical output of the transmitter-side electroabsorption modulator forming the output of the transmitter and being coupled to the optical channel, and the transmitter comprising an electrical data input, which is connected to the electrical modulation terminal of the transmitter-side electroabsorption modulator, the receiver comprises a receiver laser and a receiver-side electroabsorption modulator connected downstream of the receiver laser, the optical output of the receiver-side electroabsorption modulator forming the input of the receiver and being coupled to the optical channel, and the receiver comprising an electrical data output, which is connected to the electrical modulation terminal of the receiver-side electroabsorption modulator; and the transmitter laser and the receiver laser being detuned by the specification of a physical variable, in particular by the specification of the laser current or the laser temperature, the respective physical variable for detuning the respective laser being specified by a transmitter-side control unit and a receiver-side control unit, the transmitter-side control unit and the receiver-side control unit being synchronized with one another; and the transmitter-side control unit and the receiver-side control unit, at the respective output thereof, each specifying the same signal for establishing the physical variable for establishing the laser frequency.

Such a design of a system and a method for data transmission advantageously ensures that, by specifying a physical variable, for example the laser current or the laser temperature, the transmitter laser and the receiver laser can be detuned, resulting in injection locking of the transmitter laser and of the receiver laser, and that coherent homodyne reception is possible as a result of the precisely agreeing laser frequencies.

The option of synchronously specifying the laser frequencies of the transmitter and receiver lasers advantageously also makes it possible, in the event that, for example, discontinuities are present in the optical channel which result in reflections of light, for the laser frequencies to be matched thereto, and for crosstalk of the respective optical reception signal to be essentially entirely prevented.

In the event that discontinuities in the optical channel result in superimposition or crosstalk of the signal arriving at the receiver, it may be provided that the position of a discontinuity or of a source of optical feedback, in particular of reflections, in the optical channel, and the light propagation time that the signal requires from the receiver laser to the discontinuity and back to the receiver laser, are established, and that a signal profile and the optical frequency profile of the receiver laser resulting from the signal profile are established in such a way that the time periods of crosstalk, during which the difference between the frequency profile and the optical frequency profile shifted by the light propagation time drops below the optical bandwidth to be transmitted of the electrical signal to be transmitted, are minimal.

With such a procedure, the optical frequency of the receiver laser and of the transmitter laser is advantageously established so as to be detuned in a way that is adapted to the distance L between the receiver laser and the discontinuity so that, in this way, the detuning is at the maximum at the round-trip time, that is, the propagation time that it takes the light emitted by the receiver laser to reach the discontinuity and return to the receiver laser, and the crosstalk is thereby shifted out of the bandwidth of the optical signal arriving at the receiver.

A further improvement of the signal arriving at the receiver in the case of discontinuities that occur in the optical channel can be achieved when a sawtooth-shaped signal profile is established, the period duration $T_{per,optimal}$ of which is selected based on the light propagation time, wherein, in particular, it is provided that the lowest possible frequency of $f_{optimal}=c/2L$ is used as the sawtooth frequency for a coherent homodyne reception, where c indicates the velocity of light in the optical channel, and L is the distance between the receiver laser and the discontinuity, so that the period duration is $T_{per,optimal}=2L/c$.

Such a selection of the signal profile ensures particularly effectively that the time period during which crosstalk of the optical signal emitted by the transmitter, which is caused by reflections on a discontinuity, inevitably falls into the spectrum of the optical reception signal arriving at the receiver, is minimal.

So as to prevent data loss during the data transmission particularly effectively in the event that discontinuities occur in the optical channel, it may be provided that no data is transmitted during the time periods of crosstalk thus established.

One option for tap-proof data transmission between the transmitter and the receiver can be provided when, for the tap-proof data transmission between the transmitter and the receiver, a key is exchanged between the transmitter-side control units and the receiver-side control unit;

identical signal profiles are derived from the exchanged key in the transmitter-side control units and the receiver-side control unit; and the signal profiles are supplied to the transmitter laser and the receiver laser during the data transmission.

One option for avoiding data losses during an, in particular tap-proof, data transmission between the transmitter and the receiver can be provided when light in frequencies from the lower to the upper limit of the operating frequency band range is emitted by the receiver laser in a predefined operating frequency band range in a predefined manner, in particular with a sawtooth-shaped signal profile, over the time;

it is examined whether light in one or more frequencies within the operating frequency band range is irradiated by way of the optical channel onto the receiver-side electroabsorption modulator; and at least a frequency band within the operating frequency band range is selected for the data transmission between the transmitter and the receiver, within which no light is irradiated onto the receiver-side electroabsorption modulator.

Other features which are considered as characteristic for the invention are set forth in the appended claims.

Although the invention is illustrated and described herein as embodied in system and a method for data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
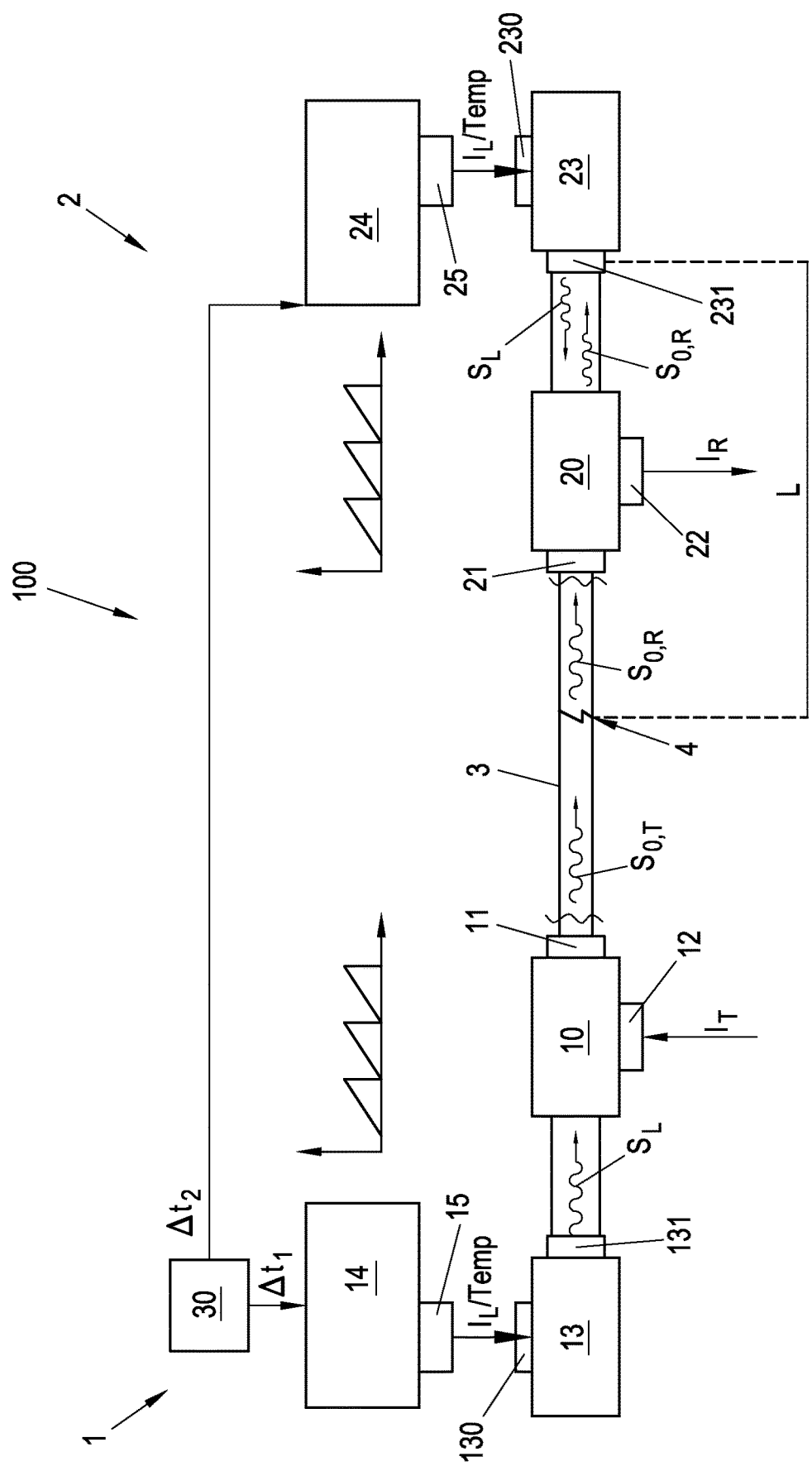
FIG. 1 shows a schematic diagram of an exemplary embodiment of a system according to the invention for data transmission.

Referring now to the figures of the drawing in detail and first, particularly, to FIG. 1 thereof, there is shown an exemplary embodiment of a system 100 according to the invention for data transmission. The system 100 comprises a transmitter 1 and a receiver 2, which are connected to one another by way of an optical channel 3, such as a fiber optic cable. The transmitter 1 comprises a transmitter laser 13 and a transmitter-side electroabsorption modulator 10 connected downstream of the transmitter laser 13. The transmitter-side electroabsorption modulator 10 comprises an optical output 11, which forms the output of the transmitter 1 and is coupled to the optical channel 3, and an electrical modulation terminal 12. The electrical data input of the transmitter 1 is connected to the electrical modulation terminal 12 of the transmitter-side electroabsorption modulator 10.

The receiver 2 of the system 100 comprises a receiver laser 23 and a receiver-side electroabsorption modulator 20 connected downstream of the receiver laser 23. The optical output 21 of the receiver-side electroabsorption modulator 20 forms the input of the receiver 2 and is coupled to the optical channel 3. The receiver 2 furthermore comprises an electrical data output, which is connected to the electrical modulation terminal 22 of the receiver-side electroabsorption modulator 20.

Electroabsorption modulators, such as the electroabsorption modulator 10, 20 shown in FIG. 1, are known from the prior art and described, for example, in T. Ido et al., *IEEE Phot. Tech. Lett.*, Vol. 6, no. 10, pp. 1207-1209 (1994). Such electroabsorption modulators 10, 20 can be co-integrated together with laser elements, such as the transmitter laser 13 or the receiver laser 23, on a chip.

It is the nature of the electroabsorption modulators 10, 20 that light $S_L$ entering these from the respective laser 13, 23 is attenuated, as a function of the voltage present at the respective electrical modulation terminal 12, 22 of the transmitter-side or receiver-side electroabsorption modulator 10, 20, and is emitted or received by way of an optical connection 11, 21 as an outgoing or incoming optical signal $S_{o,T}$, $S_{o,R}$ and coupled into or coupled out of the optical channel 3, for example an optical waveguide such as a fiber optic cable. As an alternative, the optical channel 3 can also be designed as a free-space link.

The electrical current $I_R$, $I_T$ flowing through the electrical modulation terminal 12, 22 of the electroabsorption modulator 10, 20 is approximately proportional to the quantity of light that is withdrawn from the light $S_L$ emitted by the respective laser 13, 23 and not forwarded into the transmitted, optical signal $S_{o,T}$, $S_{o,R}$.

In the present exemplary embodiment, the frequency $f_L$ of the light $S_L$ is specified within an optical frequency range F of typically ±0.1 to 1 GHz around the optical frequency $f_R$ of the received optical signal $S_{o,R}$. Likewise, the frequency $f_L$ of the light $S_L$ of the respective laser 13, 23 can also be set so as to be within an optical frequency range F of typically ±0.1 to 1 GHz around a predefined optical frequency that is specified for transmitting the optical reception signal $S_{o,R}$.

As a result of the reception signal $S_{o,R}$, which has approximately the same frequency as the light $S_L$ emitted by the receiver laser 23, irradiating on the receiver laser 23, injection locking occurs, in which the frequency of the light $S_L$ emitted by the ("slave") laser adapts to the optical ("master") frequency of the received optical signal $S_{o,R}$. The coherent optical detection of the optical reception signal $S_{o,R}$ thus takes place with exact adaptation of these frequencies, which corresponds to the case of homodyne detection in the electroabsorption modulator 20.

When the frequencies of the light $S_L$ of the transmitter laser 13 and of the received optical reception signal $S_{o,R}$ are adapted to one another by injection locking, a superimposition takes place, during which the signals included in the received optical reception signal $S_{o,R}$ end up exactly in the baseband ("homodyne detection"). These signals can thus be read out particularly easily, that is, without additional digital signal processing for the purpose of frequency offset correction, and can be identified particularly easily in the electrical reception signal $I_R$.

The transmitter laser 13 and the receiver laser 23 can be detuned in the shown exemplary embodiment by the specification of a physical variable. This can be the laser current $I_L$ or the laser temperature Temp, for example. The dependence of the light $S_L$ emitted by the laser 13, 23 on the temperature Temp of the laser 13, 23 can be utilized to roughly establish the frequency of the light $S_L$. The fine control of the frequency of the light $S_L$ can be carried out by varying the laser current $I_L$.

In the exemplary embodiment of FIG. 1, a transmitter-side control unit 14 and a receiver-side control unit 24 of the system 100 are connected to the electrical input 130, 230 of the transmitter laser 13 or of the receiver laser 23, and specify the respective physical variable for detuning the respective laser 13, 23. The laser current $I_L$ used during the generation of the light $S_L$ can be regulated by way of the electrical input 130, 230. By specifying the laser current $I_L$, the wavelength or frequency of the light $S_L$ emitted by the transmitter laser 13 or receiver laser 23 can be established, as described above.

The transmitter laser 13 and the receiver laser 23 each furthermore include an optical laser output 131, 231, from which the light $S_L$ generated by the laser 13, 23 is radiated.

The system 100 furthermore comprises a synchronization unit 30, which is connected to the transmitter-side control unit 14 and the receiver-side control unit 24 and synchronizes these with one another. As a result of this synchronization, the transmitter-side control unit 14 and the receiver-side control unit 24, at the outputs 15, 25 thereof, each specify the same signal, which is adapted to the transmission distance, for specifying the physical variable for establishing the laser frequency. This means that the start of the frequency profile at the transmitter laser 13 is synchronized with the start of the frequency profile at the receiver laser 23. However, the signal is previously transmitted across the distance between the transmitter 1 and the receiver 2, so that the frequency profile at the transmitter 1 starts slightly earlier, for example offset by the light propagation time between the transmitter 1 and the receiver 2, whereby synchronization with the frequency profile at the receiver 2 is ensured.

As a result of the superimposition of the light $S_L$ of the receiver laser 23 and the received optical reception signal $S_{o,R}$, a current signal $I_R$ is created, which is approximately proportional to the product of the field intensities of the light $S_L$ and of the reception signal $S_{o,R}$. Due to the adaptation of the frequency $f_L$ of the receiver laser 23 to the central frequency $f_R$ of the reception signal $S_{o,R}$, the frequency band created by the reception signal $S_{o,R}$ is mapped in a frequency range around 0 Hz, and thus ends up in the electrical baseband.

The optical frequencies are advantageously in the range of 150 to 800 THz. The bandwidth of the signal modulated in the optical signal $S_{o,T}$ can—as a function of the number of the parallel selected optical carrier frequencies $f_L$—be selected to be approximately in the range of several GHz, but in connection with broadband information signal may reach the range of typically 100 GHz.

In FIG. 1, the electrical reception signal $I_R$ is present at the electrical modulation terminal 22 of the receiver 2 in the form of a current signal. This current signal $I_R$ is proportional to the light output or light intensity prevailing in the electroabsorption modulator 2. Since the frequency of the light $S_L$ emitted by the receiver laser 23 is approximately set to that of the optical reception signal $S_{o,R}$, and the difference between the frequencies is less than the electro-optical bandwidth of the electroabsorption modulator 20, coherent optical detection of the optical reception signal $S_{o,R}$ results. This leads to the advantages of a higher detection sensitivity and frequency selectivity, which are known in general, that is, signal filtering takes place during the detection.

So as to transmit optical signals $S_{o,T}$ by way of an electroabsorption modulator 10 shown in FIG. 1, a transmission signal $S_T$ is specified, which is forwarded as a voltage signal $I_T$ to the particular electrical modulation terminal 12 of the electroabsorption modulator 10.

As is schematically indicated in FIG. 1, the optical channel 3 has a discontinuity 4 or a source of optical feedback. Such discontinuities 4 in the optical channel 3 cause light $S_L$ emitted by the receiver laser 23 to be partially reflected in the direction of the receiver 2 or the receiver laser 23, resulting in partial superimposition or crosstalk with the optical transmission signal $S_{o,T}$ originating from the transmitter 1. This means that this crosstalk of the optical transmission signal $S_{o,T}$, that is, the crosstalk by a simultaneously emitted signal of the receiver laser 23, falls into the bandwidth of the optical reception signal $S_{o,R}$ arriving at the receiver 2, so that the data encoded therein can only be received and read out with reduced quality at the receiver 2.

So as to prevent this, in a method according to the invention the frequency of the light $S_L$ originating from the receiver laser 23 is advantageously shifted in such a way that there is a maximum spectral distance at the receiver 2 between the optical signal $S_{o,T}$ originating from the transmitter-side electroabsorption modulator 10 and the crosstalk occurring with time delay thereto. For this purpose, the position of the discontinuity 4 or of the source of optical feedback in the optical channel 3 and the light propagation time that the light $S_L$ emitted by the receiver laser 23 requires to reach the discontinuity 4 and return to the receiver laser 23 are established.

The signal profile, or the optical frequency profile of the receiver laser 23 resulting from this signal profile, is subsequently adapted to the distance L between the discontinuity 4 and the receiver laser 23. As a result of this establishment of the signal profile, or of the optical frequency profile, it is possible to minimize the time periods of crosstalk during which the difference between the frequency profile and the optical frequency profile shifted by the light propagation time drops below the optical bandwidth to be transmitted of the electrical signal $I_T$ to be transmitted (see FIG. 2).

Figure 2:
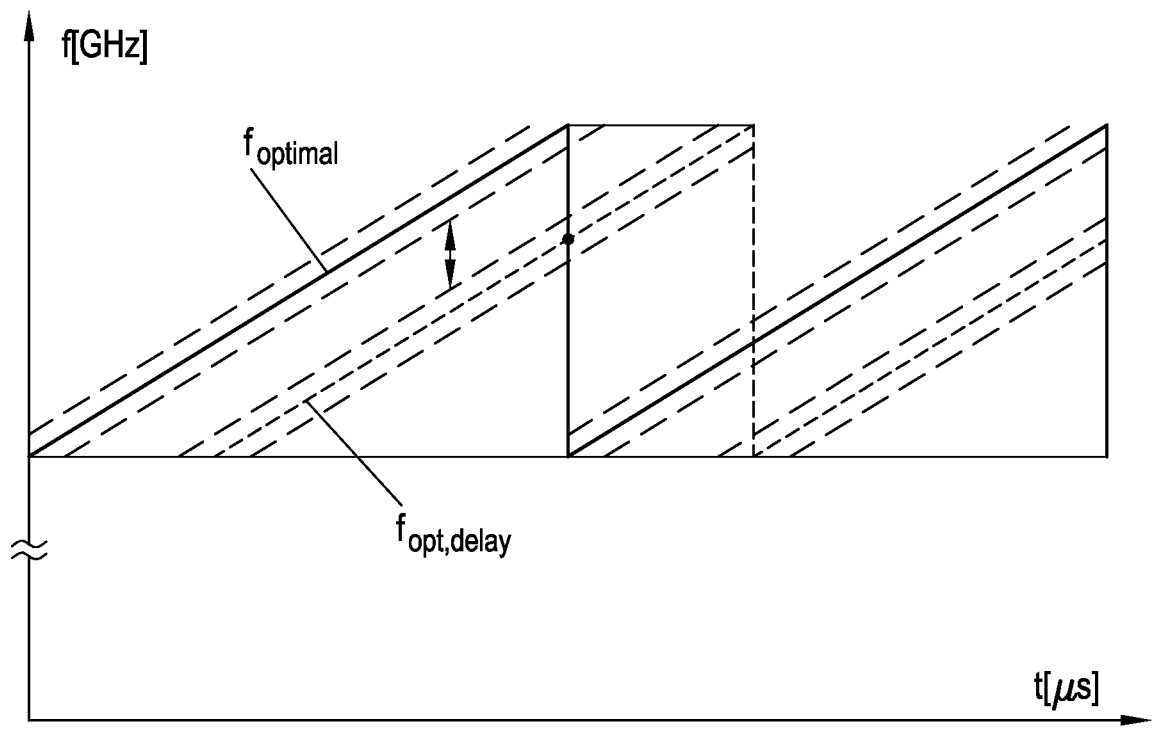
FIG. 2 shows an example of a sawtooth-shaped signal profile of a period duration $T_{per,optimal}$.

Such an optical frequency profile is illustrated in FIG. 2. As is apparent from FIG. 2, the adaptation of the signal profile or of the frequency profile to the distance between the receiver laser 23 and the discontinuity 4 maximizes the detuning at the point in time at which the light $S_L$ reflected by the discontinuity 4 arrives back at the receiver laser 23, so that the crosstalk is shifted out of the bandwidth of the optical reception signal $S_{o,R}$ arriving at the receiver 2, as is apparent from the reception spectrum in FIG. 3.

As is apparent from FIG. 2, a sawtooth-shaped signal profile is established in the exemplary embodiment, the period duration $T_{per,optimal}$ of which is selected based on the light propagation time. For example, the lowest possible frequency of $f_{optimal}=c/2L$ can be used as the sawtooth frequency. Here, c is the velocity of light in the optical channel 3, and L is the distance between the receiver 2 and the discontinuity 4, resulting in a period duration of $T_{per,optimal}=2L/c$.

If, for example, the frequency profile or the wavelength profile of the receiver laser 23 follows a sawtooth-shaped progression, having an optical emission frequency of $v_S(t)=t\Delta F/T_{per,optimal}$, where $\Delta F$ is the maximum deviation of the optical emission frequency, and $T_{per,optimal}$ is the period of the profile, the crosstalk caused by the reflection on the discontinuity 4 in the optical channel 3 shows the same yet delayed profile, with an optical frequency $v_R(t)=v_S(t+\Delta t)$. The delay $\Delta t$ is determined by the distance L between the electroabsorption modulator 20 and the discontinuity 4, which is accompanied by a round-trip time of $\Delta t=2L/c$.

The spectral offset or the shift $\Delta V$ of the crosstalk is established by the difference between the optical frequencies arriving at the receiver 2 or the electroabsorption modulator 20: $\Delta V(t)=v_R(t)-v_S(t)=2L\Delta F/cT_{per,optimal}$ The optimal frequency profile thus results when the offset is constant and at the maximum at $\Delta F$. This is the case for $f_{optimal}=1/T_{per,optimal}=c/2L$, which, as was already mentioned above, is the lowest possible frequency that ensures optimal reception of the optical transmission signal $S_{o,T}$ at the receiver 2 even in the event of crosstalk.

In the exemplary embodiment, a sawtooth function is advantageously selected as the signal profile, the edge of which has an infinitely steep drop. In the region of the edge of the frequency profile, overlap of the optical transmission signal $S_{o,T}$ with the light reflected by the discontinuity 4 cannot be avoided. However, this overlap is minimized by selecting such an asymmetrical triangular function.

Optionally, a loss of data can be completely avoided when no data is transmitted from the transmitter 1 to the receiver 2 during the time periods of crosstalk thus established.

Since the laser frequencies $f_L$ of the transmitter laser 13 and of the receiver laser 23 are each specified in the same manner, coherent homodyne detection is also possible in this case. Stable injection locking of the lasers 13, 23 is ensured in the shown exemplary embodiment in that the maximum spectral offset of the reflected signal is much greater than the frequency range of typically approximately 100 MHz used for injection locking. According to the modulation parameters, the spectral offset is typically >2 GHz and can far exceed this.

The data transmission between the transmitter 1 and the receiver 2 can optionally be designed to be tap-proof when a key is exchanged between the transmitter-side control unit 14 and the receiver-side control unit 24. Based on the exchanged key, identical signal profiles or frequency profiles are derived in the transmitter-side control unit 14 and the receiver-side control unit 24 and transmitted to the transmitter laser 13 or the receiver laser 23 during the data transmission. A synchronization of the control units 14, 24 also takes place in this case.

Advantageously, the detunability of the receiver 2 can previously be utilized to first scan the signal spectrum, so as to prevent a jump to existing channels in the case of the above-described "hopping" of the frequency profile. For this purpose, initially the entire frequency range is continuously scanned, for example by way of a sawtooth-shaped signal profile across the entire activation range of the transmitter laser 13 or of the receiver laser 23, so as to identify existing channels and mask these in the created identical signal profiles.

In the exemplary embodiment, a distinction is made between a transmitter 1 and a receiver 2, and an optical signal $S_{o,T}$ is delivered from the transmitter 1 to the receiver 2. When such a unidirectional connection, shown in FIG. 1, is involved, the crosstalk arises from the laser signal $S_L$ of the local oscillator, or of the receiver laser 23, which is emitted by the receiver 2. The transmitter 1 and the receiver 2, however, have an identical design, so that an optical signal $S_{o,T}$ can also be transmitted from the receiver 2 to the transmitter 1.

The electroabsorption modulators 10, 20, however, can also be operated bidirectionally, that is, the receiver 2 can also simultaneously transmit, and the transmitter 1 can also simultaneously receive. This is described, for example, in B. Schrenk et al., "*A Coherent Homodyne TO-Can Transceiver as Simple as an EML*", IEEE/OSA J. Lightwave Technol., vol. 37, no. 2, pp. 555-561, January 2019. In this case, the crosstalk arises from the transmission signal, which is emitted simultaneously by the receiver 2. The transmitter 1 and/or receiver 2 shown in FIG. 1 can thus each function as a transmitter and a receiver at the same time.

For each discontinuity 4 in the optical channel 3, there is not just one possible frequency for the detuning sequence, but multiple frequencies. From a practical perspective, the smallest frequency $f_{optimal}$ is preferably selected. Different optimal frequencies $f_{optimal}$ result for different distances between the electroabsorption modulator 10, 20 and the discontinuity 4. Since there are now also multiple possible frequencies for the detuning sequence, these also eventually coincide, wherein this "shared" frequency is selected. Thus, multiple possible frequency bands exist for a particular detuning sequence, of which the overlap, that is, a shared frequency, is selected.

Figure 3:
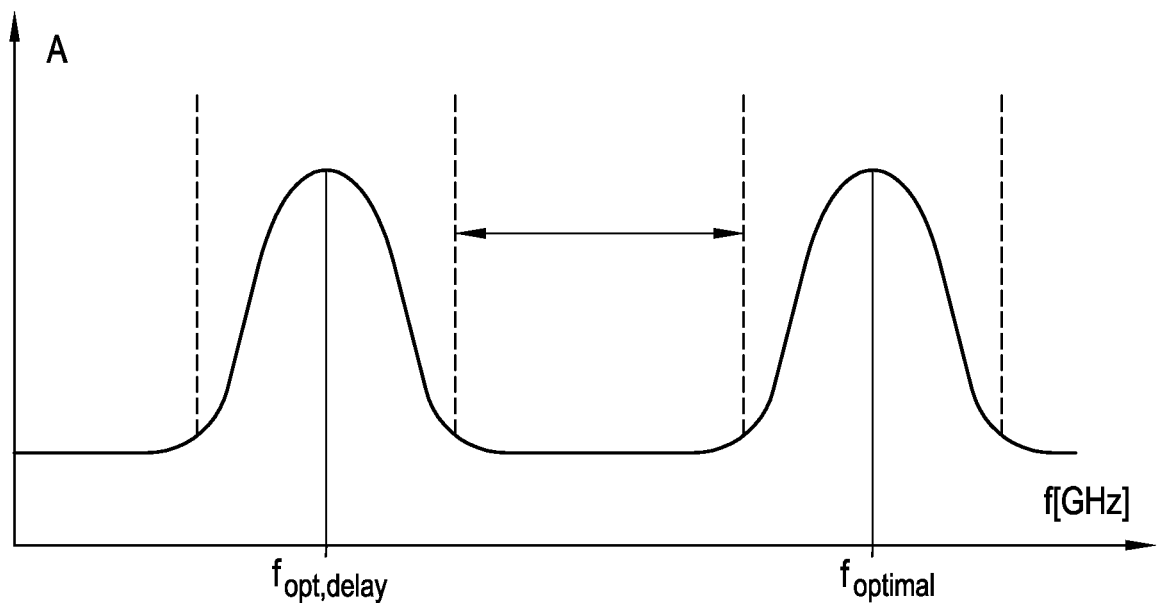
FIG. 3 shows an example for a reception spectrum.

If the shift $\Delta V$ of the detuning is selected to be large, a large distance also results between the lines of $f_{optimal}$ and $f_{opt,delay}$ shown with dotted lines in FIG. 2 and FIG. 3. The actually used frequency can vary around an optimal frequency $f_{optimal}$, wherein the shift $\Delta V$ of the detuning varies. In the case of very wide frequency bands, for example, for a possible frequency, multiple possible shared frequencies also result for different distances from a discontinuity 4. This means that the detuning $\Delta V$ can be selected to be larger in the case of multiple discontinuities 4 in the optical channel 3 so as to force the existence of shared frequencies.

The invention claimed is:

1. A system for data transmission, the system comprising:
   a transmitter and a receiver connected to the transmitter by way of an optical channel;
   said transmitter including a transmitter laser and a transmitter-side electroabsorption modulator connected downstream of said transmitter laser;
   said transmitter-side electroabsorption modulator having an optical output forming an output of said transmitter and being coupled to the optical channel; and
   said transmitter having an electrical data input connected to an electrical modulation terminal of said transmitter-side electroabsorption modulator;
   said receiver including a receiver laser and a receiver-side electroabsorption modulator connected downstream of said receiver laser;
   said receiver-side electroabsorption modulator having an optical output forming an input of said receiver and being coupled to the optical channel; and
   said receiver having an electrical data output connected to an electrical modulation terminal of said receiver-side electroabsorption modulator;
   said transmitter laser and said receiver laser being detunable by a specification of a physical variable;
   a transmitter-side control unit configured to specify the physical variable for detuning said transmitter laser and a receiver-side control unit configured to specify the physical variable for detuning said receiver laser;
   said transmitter-side control unit and said receiver-side control unit being synchronized with one another; and
   each of said transmitter-side control unit and said receiver-side control unit having an outputs configured to specify the same signal for establishing the physical variable for establishing the laser frequency.

2. The system according to claim 1, wherein the physical variable for establishing the laser frequency is a laser current or a laser temperature.

3. A data transmission method, comprising:
   providing a transmitter having a transmitter laser and a transmitter-side electroabsorption modulator connected downstream of the transmitter laser, an optical output of the transmitter-side electroabsorption modulator forming an output of the transmitter and being coupled to an optical channel, and the transmitter having an electrical data output connected to an electrical modulation terminal of the transmitter-side electroabsorption modulator;
   providing a receiver having a receiver laser and a receiver-side electroabsorption modulator connected downstream of the receiver laser, an optical output of the receiver-side electroabsorption modulator forming an input of the receiver and being coupled to the optical channel, and the receiver having an electrical data output connected to an electrical modulation terminal of the receiver-side electroabsorption modulator;
   detuning the transmitter laser and the receiver laser by specifying a physical variable, thereby specifying the respective physical variable for detuning the respective laser by a transmitter-side control unit and a receiver-side control unit, respectively;
   synchronizing the transmitter-side control unit and the receiver-side control unit with one another; and
   each of the transmitter-side control unit and the receiver-side control unit having an output each specifying the same signal for establishing the physical variable for establishing the laser frequency.

4. The method according to claim 3, wherein the detuning step comprises specifying a laser current or a laser temperature.

5. The method according to claim 3, further comprising:
   determining a position of a discontinuity or of a source of optical feedback in the optical channel, and a light propagation time required for the signal from the receiver laser to the discontinuity and back to the receiver laser; and
   establishing a signal profile and an optical frequency profile of the receiver laser resulting from the signal profile in such a way that time periods of crosstalk are minimized, during which a difference between the frequency profile and the optical frequency profile shifted by the light propagation time drops below an optical bandwidth to be transmitted of the electrical signal to be transmitted.

6. The method according to claim 5, wherein the source of optical feedback is a reflection in the optical channel.

7. The method according to claim 3, which comprises establishing a sawtooth-shaped signal profile having a period duration that is selected based on a light propagation time.

8. The method according to claim 7, which comprises using a lowest possible frequency of $f_{optimal}=c/2L$ as the sawtooth frequency for a coherent homodyne reception, where c indicates a speed of light in the optical channel, and L is a distance between the receiver laser and the discontinuity, to set the period duration at $T_{per,optimal}=2L/c$.

9. The method according to claim 3, which comprises transmitting no data during time periods of crosstalk thus established.

10. The method according to claim 3, which comprises, for a tap-proof data transmission between the transmitter and the receiver:
- exchanging a key between the transmitter-side control units and the receiver-side control unit;
- deriving identical signal profiles from the exchanged key in the transmitter-side control units and the receiver-side control unit; and
- supplying the signal profiles to the transmitter laser and the receiver laser during the data transmission.

11. The method according to claim 3, which comprises:
- emitting light in frequencies from a lower limit to a upper limit of the operating frequency band range by the receiver laser in a predefined operating frequency band range in a predefined manner over the time;
- examining whether light in one or more frequencies within the operating frequency band range is irradiated by way of the optical channel onto the receiver-side electroabsorption modulator; and
- selecting at least one frequency band within the operating frequency band range for a data transmission between the transmitter and the receiver, within which no light is irradiated onto the receiver-side electroabsorption modulator.

12. The method according to claim 11, wherein the emitting step comprises emitting light with a sawtooth-shaped signal profile.

* * * * *